United States Patent [19]
Lukas et al.

[11] Patent Number: 5,263,038
[45] Date of Patent: Nov. 16, 1993

[54] FREQUENCY FILTERED SOLID-STATE LASER

[75] Inventors: Gregory J. Lukas, Lisle; Daniel M. Ott, Glendale Heights, both of Ill.

[73] Assignee: Amoco Corporation, Chicago, Ill.

[21] Appl. No.: 830,709

[22] Filed: Feb. 3, 1992

Related U.S. Application Data

[63] Continuation-in-part of Ser. No. 662,179, Feb. 28, 1991.

[51] Int. Cl.⁵ .............................. H01S 3/10
[52] U.S. Cl. ........................ 372/22; 372/21; 372/29; 372/31; 372/32; 372/27; 372/75; 359/328
[58] Field of Search .............. 372/22, 21, 32, 29, 372/31, 27, 75; 359/328

[56] References Cited

U.S. PATENT DOCUMENTS

| | | | |
|---|---|---|---|
| 4,247,166 | 1/1981 | Yeh | 350/374 |
| 4,272,694 | 6/1981 | Jacobs | 359/328 |
| 4,305,046 | 12/1981 | Le Floch et al. | 372/27 |
| 4,331,891 | 5/1982 | Rizzo | 359/328 |
| 4,346,314 | 8/1982 | Craxton | 307/427 |
| 4,500,178 | 2/1985 | Yeh | 350/404 |
| 4,548,479 | 10/1985 | Yeh | 350/404 |
| 4,809,291 | 2/1989 | Byer et al. | 372/22 |
| 4,884,277 | 11/1989 | Anthon | 372/22 |
| 4,914,664 | 4/1990 | Woodward | 372/20 |
| 4,933,947 | 6/1990 | Anthon | 372/34 |
| 5,012,473 | 4/1991 | Reedy | 372/19 |
| 5,031,182 | 7/1991 | Anthon et al. | 372/31 |

*Primary Examiner*—Georgia Y. Epps
*Attorney, Agent, or Firm*—Stephen G. Mican

[57] ABSTRACT

A method is provided for controlling the output frequency of a laser having a lasant gain medium which is characterized by at least two gain curve distributions over a range of lasant frequencies and having a laser cavity which is characterized by at least one resonant frequency within one gain curve distribution. The method comprises the steps of: locating in the laser cavity a first Lyot filter which has a transmission band which favors the frequency range of one gain curve distribution in preference to the frequency range of the other gain curves; and locating in the cavity a second Lyot filter which has a transmission band which favors said one resonant frequency within the frequency range of the one gain curve, whereby an essentially single frequency output is obtained.

31 Claims, 1 Drawing Sheet

FREQUENCY FILTERED SOLID-STATE LASER

RELATIONSHIP TO PRIOR APPLICATIONS

This patent application is a continuation-in-part of U.S. patent application Ser. No. 07/662,179 which was filed on Feb. 28, 1991.

TECHNICAL FIELD

This invention relates to the general subject of lasers, and, in particular, to the subject of solid-state, diode-pumped lasers.

BACKGROUND OF THE INVENTION

Intracavity doubled Nd:YAG lasers were proposed as sources of green light more than 20 years ago, and many such devices have been built and analyzed in the ensuing years. Typical devices consisted of a Nd:YAG rod, a Brewster polarizer and a Type-I phase-matched crystal, such as $Ba_2NaNb_5O_{15}$ or $LiIO_3$. Several examples of this type of device are shown in the book by Koechner, *Solid State Laser Engineering*, Springer-Verlag, 2nd edition, 1988. In general, it was observed that these devices were much less stable with the non-linear crystal in the cavity than they were without it. Several tentative explanations involving modebeating or thermal effects were suggested, but no definitive studies were carried out. It was often thought that the non-linear crystal was simply a non-linear amplifier for fluctuations already present in the undoubled laser. Stability was not the only problem with these devices; crystal damage and other materials problems tended to limit the performance of the devices.

Interest in intracavity doubled lasers was renewed in the 1980s when new non-linear materials and diode-laser pumping techniques became available. One new non-linear material was $KTiOPO_4$, potassium titanyl phosphate or KTP, a highly non-linear material which was free from many of the mechanical, thermal and optical problems which had plagued earlier materials. Phase-matching in KTP is Type-II, so the simple Brewster plate polarizers used with earlier materials were not adequate.

Using Type-II non-linear crystals, such as KTP, for intra-cavity second harmonic generation (SHG) introduces a variety of polarization related problems. Placing a birefringent crystal in an unpolarized laser cavity often produces undesirable effects because the crystal axis will define two orthogonal polarizations that will, in general, differ in both their optical path lengths and losses. The path length difference leads to two weakly coupled sets of resonant cavity frequencies which often give rise to erratic mode-hopping behavior and output noise. Furthermore, any differences in the relative losses for each polarization tend to result in a laser output which is polarized along one axis of the crystal. Since radiation polarized along two crystal axes is required for Type-II doubling, output radiation polarized along only one axis would prevent or at least degrade the efficiency of the SHG process. Retardation plates have been used to control the polarizations inside the cavity. The issue of noise was not addressed. Typical examples are found in the following U.S. Pat. Nos.: 4,413,342 to Cohen, et. al.; 4,127,827 and 3,975,693 to Barry et al.; 4,617,666; 4,637,026; 4,048,515; and 4,618,957 to Liu.

Baer appears to have been the first to have built a diode-laser pumped Nd:YAG laser which was intracavity doubled with KTP. See for example, U.S. Pat. Nos.: 4,653,056; 4,656,635; 4,701,929; 4,756,003; and 4,872,177. An early cavity used by Baer consisted of an end-pumped Nd:YAG rod, a KTP crystal and a curved reflector, and had no polarization controlling elements. Baer reported the following results: (1) when the laser was operated without an intracavity etalon, it exhibited optical noise having a frequency in the range from about 10 kilohertz to multiples of 100 kilohertz; (2) when an etalon was added to reduce the number of oscillating modes to two, well-defined oscillations in optical power were observed; and (3) when the laser was forced to run in a single mode with an etalon, the output power was stable, but the laser produced very little green output. Baer interpreted his results in terms of a rate equation model which included both sum generation and cross saturation effects. Baer believed that the laser amplitude fluctuations occurred because the system has two non-linear feedback mechanisms operating on two different timescales. He concluded that the oscillations were a fundamental barrier to successful multimode operation of intracavity doubled lasers.

Later designs by Baer added a Brewster plate polarizer oriented at 45° from the axis of the KTP to provide equal power in the two crystal polarizations. This design suffered from the fact that, in general, a Brewster plate and a birefringent crystal cannot be combined in a low-loss optical cavity. The linear polarization passed by the Brewster plate will be transformed by the KTP into an elliptical polarization that will experience a significant loss upon passing through the Brewster plate. We have found that only in the special case (not described or discussed by Baer) when the KTP functions as a half-integral waveplate, will the cavity losses be low. Because KTP is strongly birefringent, having temperature-dependent refractive indices, a typical few millimeter long, doubling crystal of KTP will act as a temperature-variable, multiple-order retardation plate. In general, we have found that for low-loss eigenmodes to exist in a laser cavity containing a Brewster plate and a birefringent element, the birefringent element must be a full-or half-wave plate. Thus, success in producing a low loss optical cavity at a given wavelength is critically dependent upon rigid control of the crystal length and the cavity temperature. A sensitive inter-relationship exists between crystal length, cavity temperature and polarization losses.

Other have also attempted to make a solid-state laser which uses non-linear crystal or lasant material to produce green light from infrared light using the principles of second harmonic generation. The following U.S. patents are illustrative of the many practitioners who have attempted to make a practical apparatus: U.S. Pat. Nos. 3,624,549 to Geusic et al.; 3,750,670 to Palanos et al.; 3,619,637 to Godo et al.; and 4,856,006 to Yano et al.

More recently, Anthon et al. disclosed an intracavity frequency doubled laser (U.S. Pat. No. 4,933,947 and assigned to AMOCO Corporation) having improved amplitude stability. This was achieved by substantially eliminating spatial hole burning in the lasant material and by maintaining the optical cavity of the laser at a temperature which results in substantially noise-free generation of optical radiation.

Despite what appears to be a fairly complete, general understanding of the theory of the frequency doubling process, a reliable, solid-state, diode-laser-pumped, frequency-doubled laser has yet to find complete acceptance in the market place. Heretofore such lasers have been plagued with a variety of problems. These problems have included: a variation in power output during start-up; output powers which vary significantly with changes in temperature and over time; non-repeatable output power with a variation in cavity temperature; multiple (e.g., two or three) spectral modes running simultaneously; differing polarizations in the spectral modes without any consistent relationship between them; an infrared (IR) polarization which was not defined; spectral modes and output powers which change when the laser is tapped or slightly vibrated; and laser operation (i.e., output power and spectral modes) which seem to be unduly sensitive to normally occurring changes in the characteristics of the pumping diode-laser.

There are also problems in the operation of non-frequency doubled, diode-pumped, solid-state lasers. Due to the smallness of the optical wavelengths, a simple laser cavity can support oscillation at many different wavelengths. A laser cavity resonator may oscillate simultaneously at several wavelengths, and in several "temporal modes", or oscillation may alternate between one or more of the modes competing for the gain of the laser. The spectral content of such a laser is irregular; the bandwidth may be large but the intensity is principally divided among the several and sometimes thousands of modes of oscillations. The output pulse intensity from such a multimode, broadband laser is typically characterized by a highly modulated, rapidly fluctuating shape. For many applications, an output at a single wavelength/frequency and mode is desirable. Much research has been voted to design lasers whose output is exactly single wavelength. Those lasers that come closest to a "single wavelength" or "single frequency" oscillate in substantially a single temporal and spatial mode and have a very narrow bandwidth around that single wavelength.

Clearly a reliable and dependable, single-frequency laser would be welcomed by the photonics industry. More importantly, if a solid-state, diode-laser source of infrared optical pumping radiation is used, a miniature source of stable laser light can be obtained.

SUMMARY OF THE INVENTION

A general object of the invention is to provide an apparatus and method for producing a laser having a frequency filtered output.

One object of the invention is to provide a laser having a single frequency output obtained by using one or more birefringent filters.

Another object of the invention is to provide a laser having a dual frequency output obtained by using one or more of birefringent filters.

One specific object of the invention is to provide a method of controlling the output of a solid-state laser by using two birefringent filters which share a common Brewster plate.

Still another object of the invention is to provide a diode-pumped, solid-state laser and method for producing a stable and reliable source of single frequency laser light.

Yet another object of the invention is to provide a stable and reliable solid-state, diode-laser-pumped laser and method which uses Nd:YAG and $TeO_2$, which does not have the problems resulting from spatial hole burning, and which has a single-frequency output.

In accordance with the present invention a laser is disclosed comprising a lasant material lases at a predetermined wavelength in response to optical pumping radiation and which has a front end and a back end; an input mirror for substantially reflecting lasant light towards said back end of said lasant material; an output coupler for substantially reflecting laser light towards said input mirror and for passing therethrough at least some laser light at said predetermined wavelength; polarizing means, located to receive said light at said predetermined wavelength from said lasant material, for polarizing said lasant light from said lasant material; and birefringent means, located to receive said polarized laser light and having a length which has the effect of giving a phase retardation which is an integral multiple of the half wavelength of said light at said predetermined wavelength, for producing a generally monochromatic output.

In accordance with the present invention, a method is provided for controlling the output frequency of a laser having a lasant gain medium which is characterized by at least two gain curve distributions over a range of lasant frequencies and having a laser cavity which is characterized by at least one resonant frequency within one of at least two gain curve distributions, comprising the steps of: inserting in the laser cavity a first birefringent filter which has a transmission band which favors at least part of the frequency range of said one gain curve distribution in preference to at least part of the frequency range of said other gain curves; and inserting in the cavity a second birefringent filter which has a transmission band which favors at least one resonant frequency within said one gain curve distribution such that at least one single frequency output is obtained.

The laser system just described, when Nd:YAG is used as the lasant material and when $TeO_2$ is used as the birefringent means, functions as a stable source of laser light (e.g., 1064 nm and 1318.7 nm). The single frequency laser of the present invention has been found to be a precise source of power, since it runs in a well-defined, single spectral mode with consistent polarization. In addition, the efficiency is high and output power variations due to changes in cavity temperature are repeatable. Also, the mode distribution does not change when the laser is slightly vibrated, struck or if the pump mode changes (i.e., commonly seen in laser diodes). Moreover, the invention allows one to obtain a stable source of two laser frequencies of opposite polarization. The invention provides the following features and characteristics:

1. The laser's frequency can be temperature tuned over a much greater range (i.e., over the full gain curve);

2. A dual line laser for sensor applications can be made with an output either at the same polarization or at orthogonal polarizations;

3. Improved stability in regards to power and frequency (e.g., mode hops);

4. A strong Lyot filter could make the laser insensitive to back reflections such that an optical isolator would not be needed for fiber applications; and 5. The output remains single-frequency even under high gain conditions.

Numerous other advantages and features of the present invention will become readily apparent from the following detailed description of the invention, the embodiments described therein, from the claims, and from the accompanying drawings.

DETAILED DESCRIPTION

Figure 1:
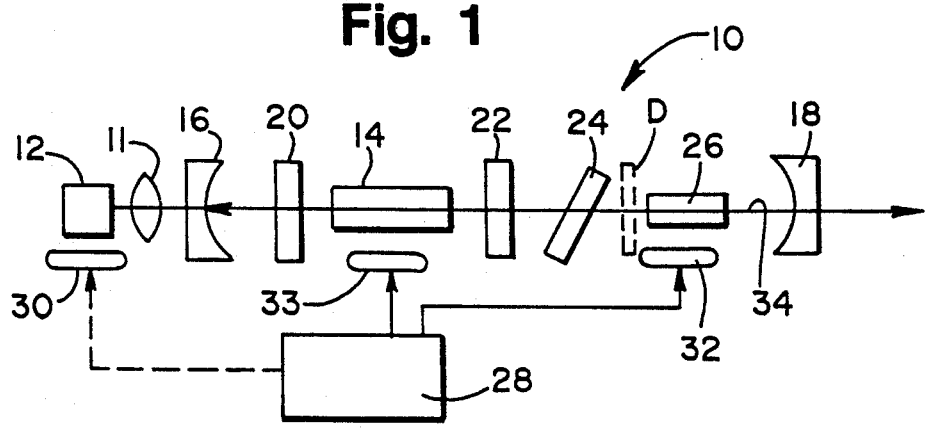
FIG. 1 is a schematic diagram of the single frequency laser that is the subject of the present invention.

While this invention is susceptible of embodiment in many different forms, there is shown in the drawings, and will herein be described in detail, at least three specific embodiments of the invention. It should be understood, however, that the present disclosure is to be considered an exemplification of the principles of the invention and is not intended to limit the invention to the specific embodiments illustrated.

Turning to FIG. 1, there is illustrated a single frequency laser 10 which comprises: a source 12 of optical pumping radiation, a lasant material 14, an input mirror 16, an output coupler 18, two quarter-wave plates 20 and 22, a polarizing element 24, and a birefringent material or element 26 (e.g., a frequency doubling material like KTP, $TeO_2$, $PbMoO_4$, etc.). A temperature control 28 is used to control a thermoelectric cooler 30 for the source 12 and heaters or coolers 32 and 33 for the laser cavity.

The source 12 provides optical pumping radiation to the lasant material 14. A focusing means or lens 11 (e.g., an optical element having a gradient refractive index or GRIN, a ball lens, an aspheric lens, a combination of lenses, etc.) can be used to focus the output of the source 12 onto the lasant material 14. This focusing results in a high pumping intensity and an associated high photon to photon conversion efficiency in the lasant material 14. Any number of combinations of sources and lasant materials can be used.

Preferably, the source 12 is a light emitting semi-conductor, such as a diode-laser or diode-laser array, and the lasant material 14 is an essentially non-birefringent crystal, such as a garnet doped with a rare-earth, active material (e.g., Nd:YAG), or a crystal that includes a rare-earth, active material which is a stoichiometric component of the lasant host material (e.g., lithium neodymium tetraphosphate (LNP) or neodymium pentaphosphate (NPP).

If desired, the output facet of the semiconductor light source 12 can be placed in a close coupled or in butt-coupled relationship to input face of the lasant material 14 without the use of a focusing means 11. As used herein, "butt-coupled" is defined to mean a coupling which is sufficiently close such that a divergent beam of optical pumping radiation emanating from semiconductor light source 12 will optically pump a mode volume within a lasant material 14 with a sufficiently small transverse cross-sectional area so as to support essentially only single transverse mode laser operation (i.e., $TEM_{00}$ mode operation) in the lasant material 14.

Highly suitable lasant materials 14 for butt-coupled operation include neodymium-doped YAG or Nd:YAG, gadolinium gallium garnet ($Gd_3Ga_5O_{12}$) or GGG, and gadolinium scandium gallium garnet ($Gd_3Sc_2Ga_3O_{12}$) or GSGG, and especially LNP or NPP. By way of specific example, neodymium-doped YAG is a highly suitable lasant material for use in combination with an optical pumping means which produces light having a wavelength of about 800 nm. When pumped with light of this wavelength, neodymium-doped YAG can emit light having a wavelength of approximately 1064 nm.

The precise geometric shape of lasant material 14 can vary widely. For example, lasant material can be rod-shaped, or rhombohedral in shape if desired. If desired, an end-pumped fiber of lasant material can be used. Highly suitable fibers for this purpose include, but are not limited to, glass optical fibers which are doped with ions of a rare-earth metal such as neodymium. The length of such a fiber is easily adjusted to result in absorption of essentially all of the optical pumping radiation. If a very long fiber is required, it can be coiled, on a spool for example, in order to minimize the overall length of the laser of this invention.

A highly suitable source 12 of optical pumping radiation consists of a gallium aluminum arsenide laser diode array, emitting light having a wavelength of about 800 nm, which is attached to heat sink. Such laser diodes are well known to those skilled in the art and may be obtained from a variety of suppliers (e.g., Spectra-Diode Laboratories, SONY, Laser Diode Inc., Siemens, etc.). The heat sink can be passive in character. However, the heat sink can also comprise a thermoelectric cooler 30 to help maintain laser diode array 12 at a constant temperature and thereby ensure optimal operation of laser diode array at a constant wavelength. The temperature of a laser diode source 12 can be regulated by means of control electronics 28. Separate controls for temperature regulation of the source 12 and the pumped laser cavity can be used. It will also be appreciated, of course, that during operation the optical pumping means or source 12 will be attached to a suitable power supply. Electrical leads from laser diode array which are directed to a power supply are not illustrated in the drawings for clarity.

A laser cavity having a longitudinal extending axis 34 is formed by the input mirror 16 and the output coupler or mirror 18. The input mirror 16 is highly (e.g., 99% or more) reflective (HR) at the wavelength (i.e., the fundamental or $\lambda_F$) of the lasant material rod 14 (e.g., 1064 nm for Nd:YAG). The input mirror 16 is coated so as to transmit the light from the source 12 (e.g., highly transmissive (HT) at about 85% or more).

The output coupler 18 is a mirror which is coated to be reflective (e.g., about 97%–99%) at the wavelength of light emitted by the lasant material or rod 14 (e.g., 1064 nm (red) for Nd:YAG lasing at 1064 nm). If a frequency doubling birefringent material 26 is used, the output coupler is coated to be HT at a harmonic of the wavelength emitted by the lasant material 14 (e.g., 532 nm (green)). The output mirror 18 and input mirror 16 are conventional in character and, for example, can comprise suitable conventional coatings on appropriate substrates.

If a frequency doubling birefringent material 26 is used, light from the lasant material or rod 14 interacts with it to double the frequency of the light from the lasant material. Materials having non-linear optical properties are well-known. For example, U.S. Pat. No. 3,949,323 issued to Bierlein et al. discloses that non-linear optical properties are possessed by materials having the formula $MTiO(XO_4)$ where "M" is at least one of K, Rb, Ti and $NH_4$; and "X" is at least one of P or As, except when $NH_4$ is present, then "X" is only P. This generic formula includes potassium titanyl phosphate (KTP) or KTiOPO$_4$, a particularly useful non-linear material.

If a frequency doubling birefringent material 26 is used, KTP is preferred. KTP has one of the highest non-linear optical coefficients. KTP is a biaxial material having axes which are preferably arranged for Type-II phase-matching (e.g., having its Z-axis perpendicular to the reference axis 34 of the cavity and at about 45° to one side of a plane (i.e., a plane coincident with the plane of drawings and the direction of polarization established by the polarizing element 24) which lies along the reference axis).

Non-linear optical materials, such as KTP, have the ability of converting light at predetermined or fundamental wavelength into light at a harmonic of that light (i.e., light at frequency $\omega$ is converted to light at the second harmonic $2\omega$ or near-infrared light at a wavelength of 1064 nm is converted to green light at a wavelength of 532 nm). Other non-linear optical materials which are suitable for frequency doubling include: potassium dihydrogen phosphate (KDP) or KH$_2$PO$_4$; ammonium dihydrogen phosphate (ADP) or NH$_4$H$_2$PO$_4$; ammonium dihydrogen arsenate (ADA) or NH$_4$H$_2$AsO$_4$; cesium dideuterium arsenate (CDA) or CsH$_2$AsO$_4$; beta-barium-borate (BBO) or $\beta$-BaB$_2$O$_4$; lithium triborate (LBO) or LiB$_3$O$_5$; as well as KTiOAsO$_4$, lithium idodate (LIO) or LiIO$_3$, LiNbO$_3$, KNbO$_3$, HIO$_3$, KB$_5$O$_8$-4H$_2$O, KLiNbO$_3$, and organic materials including urea. A review of the non-linear optical properties of a number of different uniaxial crystals has been published in *Sov. J. Quantum Electron*, Vol. 7, No. 1, January 1977, pp. 1-13. Non-linear optical materials have also been reviewed by S. Singh in the *CRC Handbook of Laser Science and Technology*, Vol. III, M. J. Weber, Ed., CRC Press, Inc., Boca Raton, Fla., 1986, pp. 3-228.

The conversion of optical radiation of one frequency to optical radiation of another frequency through interaction with a non-linear optical material is well-known and has been extensively studied. Examples of such conversion include harmonic generation, optical mixing and parametric oscillation. Second-harmonic generation or "frequency doubling" is perhaps the most common and important example of non-linear optics wherein part of the energy of an optical wave of angular frequency $\omega$ propagating through a non-linear optical crystal is converted to energy of a wave of angular frequency $2\omega$. Second-harmonic generation has been reviewed by A. Yariv in *Quantum Electronics*, Second Ed., John Wiley & Sons, New York, 1975 at pages 407-434 and by W. Koechner in *Solid State Laser Engineering*, Springer-Verlag, New York, 1976 at pages 491-524.

Electromagnetic waves having a frequency in the optical range and propagating through a non-linear crystal are believed to induce polarization waves which have frequencies equal to the sum and difference of those of the exciting waves. Such a polarization wave can transfer energy to an electromagnetic wave of the same frequency. Those skilled in the art know that the efficiency of energy transfer from a polarization wave to the corresponding electromagnetic wave is a function of: (a) the magnitude of the second order polarizability tensor of the optical material (since this tensor element determines the amplitude of the polarization wave); and (b) the distance over which the polarization wave and the radiated electromagnetic wave can remain sufficiently in phase, or "phase-matched" for the non-linear conversion process.

A conventional method for achieving such phase-matching in a non-linear optical material utilizes the fact that dispersion (the change of refractive index with frequency) can be offset by using the natural birefringence of uniaxial or biaxial crystals. Such crystals have two refractive indices for a given direction of propagation which correspond to the two allowed, orthogonally-polarized propagation modes. Accordingly, by an appropriate choice of polarization, direction of propagation and crystal axes orientation, it is often possible to achieve phase-matching in a birefringent non-linear optical crystal. The term "phase-match axis," as used herein, refers to a line or direction through a non-linear optical crystal along which the substantially phase-matched conversion of a stated input radiation into a stated output radiation is permitted for at least certain polarizations of said input radiation. Type-I phase-matching requires that the incident waves interacting in the non-linear optical material have the same polarization. Type-II phase-matching requires that the incident waves interacting in the non-linear optical material have orthogonal polarizations. KTP is a frequency doubling material that can be Type-II phase matched.

If a birefringent non-frequency doubling material 26 is used with Nd:YAG, it is preferably a crystal of optical grade TeO$_2$ (i.e., tellurium dioxide). TeO$_2$ has the advantage of having a high birefringence in combination with dispersion, such that a short crystal can be used. For example if quartz were used, it would have a length on the order of 65 mm. A TeO$_2$ crystal having a length of 3.2 mm would perform just as well. One advantage of a shorter birefringent material is that the length of the cavity is shorter and, as a consequence, the free spectral range between modes is greater. This reduces noise (e.g., amplitude noise) and ensures a more stable output.

In any case the birefringent material 26 is preferably temperature tuned so that it has an effective length of an integral multiple of half the wavelength of the fundamental (e.g., $\lambda_F/2$, $\lambda_F$, $3\lambda_F/2$, etc.) at which the lasant rod 14 lases (i.e., $\lambda_F$). A heater 32 and conventional control electronics 28 can be used for this purpose. In a short cavity, temperature regulation of the laser diode source 12 can affect the temperature of the birefringent optical material 26. Preferably, a pre-established temperature gradient is detected and maintained. A heating element 33 adjacent to the lasant rod 14 and another element 32 adjacent to the birefringent material 26 can be used to establish and maintain a desired temperature gradient. Judicious selection and location of temperature sensors will minimize temperature feedback and cross-talk between the source cooler 30 and the cavity gradient heaters 33 and 32. Alternatively, the birefringent material 26 can be housed to insulate it from the source 12. By keeping the birefringent material 26 at this preferred length, polarized light at the fundamental wavelength will under-go a phase shift of an integral multiple of 180° each time it passes through it.

Figure 2:
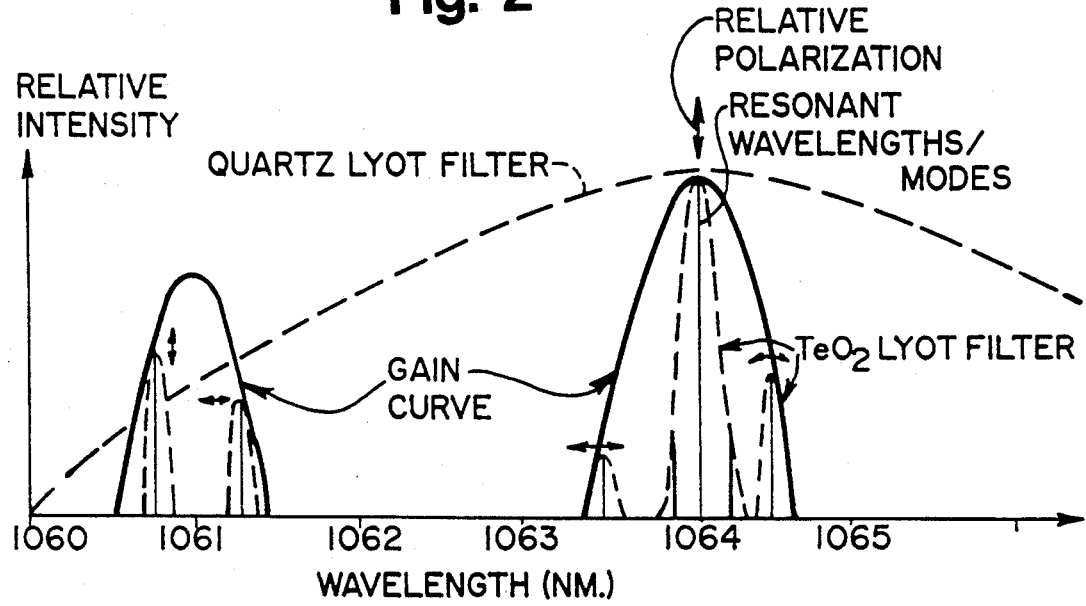
FIG. 2 is a diagram of the spectral distribution of the emission bands of Nd:YAG and the performance of the laser of FIG. 1.

In selecting a birefringent material 26, several factors should be considered:

(1) material losses (e.g., absorption, coatings, etc.) relative to cavity gain;

(2) the effect of temperature (i.e., for the same length or thickness of material at the same wavelength (e.g., 1064 nm), it takes a change of 10° C. in KTP and 50° C. in TeO$_2$ to change the retardation by a half-wave length (e.g., 1.16 nm separation between a full-wave and a half-wave line in FIG. 2));

(3) the effect of material length or thickness (i.e., for a fixed temperature and wavelength (e.g., 1064 nm), a half-wave retardation change of 1.16 nm occurs in a KTP crystal having a thickness of 5 mm or in a $TeO_2$ crystal having a thickness of 3.2 mm (e.g., for propagation down the $-110$ axis in $TeO_2$));

(4) the size constraints on the laser cavity; and (5) the cost and availability of the birefringent material (e.g., KTP is more expensive than $TeO_2$).

The two quarter-wave plates 20 and 22 function primarily as a means for substantially eliminating spatial hole burning in lasant material by causing circular polarization of the cavity radiation and thereby creating a "twisted mode" optical cavity. The twisted mode technique for producing an axially uniform energy density in a laser cavity is described by V. Evtuhov et al., *Appl. Optics*, Vol. 4, No. 1, pp. 142–143 (1965). Also see Draegert, "Efficient Single-Longitudinal-Mode Nd:YAG Laser," *IEEE J. Quant. El.*, QE-8, 235 (1972).

Any conventional means for substantially eliminating spatial hole burning in the lasant material can be used in the practice of this invention. For example, spatial hole burning can be eliminated through the use of a traveling wave, ring-like optical cavity, by mechanical motion, or by electro-optic phase modulation. Here, the quarter-wave plate 22, which is located next to the polarizing element 24, is oriented with an axis (e.g., its fast axis) at about 45° from a plane containing the direction of polarization established by the polarizing element 24 along the reference axis 34. This same quarter-wave plate 22 is also aligned to the optical axis of the birefringent material 26.

Preferably the two quarter-wave plates 20 and 22 are identical, and are arranged to have corresponding axes aligned to each other and the reference axis 34 (e.g., fast axis of waveplate 22 is parallel to the fast axis of waveplate 20). Quartz waveplates 20 and 22 having a thickness of 1.01 mm have been used. The quarter-wave plates 20 and 22 are located adjacent to opposite ends of the lasant rod 14. The result is a standing wave pattern in the cavity which is linearly polarized at the cavity end mirrors 16 and 18. The mode is circularly polarized in the laser rod 14; this gives a standing wave where the electric field vector rotates through the gain medium or laser rod, and where there are no standing wave nodes within the gain medium.

The function of the input mirror 16 can be obtained by coating one waveplate 20 with suitable reflective coatings (e.g., anti-reflection (AR) at about 800 nm and HR at approximately 1064 nm on one side and AR at 1064 and 800 nm on the other side). This reduces the number of components, cavity length and often the total cost.

The last component of the laser 10 is a polarizing element 24. Preferably, the polarizing element 24 is a Brewster plate (e.g., made from fused silica) whose plane is at the plate's Brewster angle to the reference axis 34. The polarizing element 24 establishes a direction of polarization within the laser cavity which, according to the orientation of FIG. 1, is in the plane of the drawings. The two quarter-wave plates 20 and 22, together with a non-birefringent lasant material (e.g., Nd:YAG) form a field of circular polarized light which are summed together in going from one end to the other end of the resonant laser cavity. The polarization can also be achieved by means of coatings on mirrors, a dielectric polarizer, or other suitable polarization means. A Brewster angled surface at one end of the lasant rod 14 can be used if quarter-wave plates are not needed to control spatial hole burning.

The combination of the polarizing element 24 and the birefringent material 26, having an effective length which is an integral multiple of half the wavelength of the fundamental, functions in a manner which is similar to a Lyot filter (i.e., a Lyot-Ohman filter) for laser radiation reflecting back and forth within the cavity. A Lyot filter is a monochromatic polarizer. Since spatial hole burning is controlled by the two quarter-wave plates 20 and 22, and uniform intensity between the two quarter-wave plates is achieved by the polarizing element 24, the output light from this cavity is essentially single frequency.

To further limit the number of oscillating spatial modes (i.e., maintain the $TEM_{00}$ mode) an aperture disk "D" can be inserted between the laser rod 14 and the frequency doubling element 26. In one embodiment, when KTP having a cross section of about 1.5 mm$^2$, was used as the birefringent material 26, an aperture of approximately 0.03 inches in diameter was found to work satisfactorily. Those skilled in the art will understand that the aperture disk may be located anywhere in the cavity and that its size is a function of pump cross section, mirror radius and cavity length.

The components of the present invention may be assembled in any one of a number of different ways. Assembly is facilitated by building the laser from two sub-assemblies, in particular, an upper sub-assembly comprising: the output mirror 18, the birefringent material 26, an aperture disk "D" (if used) and the polarizing element 24; and a lower assembly comprising: a GRIN lens, two quarter-wave plates 20 and 22, and the laser rod 14. More specifically, each sub-assembly is formed by mounting the components in disk-like holders, stacking the holders, and locking the holders in place. In forming the upper sub-assembly, the axes of the birefringent material 26 are aligned (e.g., preferably at about 45° if KTP is used) to the direction of polarization established by the polarizing element 24. After each sub-assembly is formed, the two sub-assemblies are stacked and locked together, making sure that the principal directions or axes of the birefringent material 26 of the upper sub-assembly are aligned as closely as possible (e.g., within one degree of arc or better) to the axes of the quarter-wave plate 22 (i.e., in the lower sub-assembly) which is located adjacent to the polarizing element 24.

The Lyot filter, comprising the birefringent material 26 and the polarizing element 24 can be a strong wavelength-selective element. By suitable choice of materials, it should be possible to operate the laser 10 in a single frequency regime without the elimination of spatial hole burning; thus, in some situations and applications, the quarter-wave plates 20 and 22 may not be needed. The elimination of the quarter-wave plates 20 and 22 allows the design shown in FIG. 1 to be implemented using fewer components.

The quarter-wave plates 20 and 22 serve another function besides the elimination of spatial hole burning. If they are of different thicknesses, or if they are oriented with their optical axis aligned, then they constitute a second birefringent element in the cavity. Moreover, since they are at the opposite end of the cavity from the output coupler 18, they form a second elementary Lyot filter. By suitable choice of the effective lengths or thicknesses of the quarter-wave plates, the free spectral range of this second Lyot filter (i.e., parts 20, 22 and 24) can be made much larger than that of the Lyot filter (i.e., parts 24 and 26) at the other end of the cavity. This results in a situation where one Lyot filter (i.e., parts 24 and 26) has the effect of selecting a specific mode (i.e., vertical lines in FIG. 2) at which the laser operates while the quarter-wave plate Lyot filter (i.e., parts 20, 22 and 24) functions to prevent oscillation of some further removed undesirable mode (e.g., ones within gain curves at 1061 nm and 1074 nm when Nd:YAG is the lasant material). Thus, in this configuration, and where there is only one low-loss mode available, there may be no need to directly or specifically eliminate spatial hole burning. A similar effect can be obtained if the two quarter-wave plate combination is replaced with a single full-wave or half-wave plate.

The effective length or thickness of the birefringent material 26 affects the characteristics of the laser's output. In the case of Nd:YAG lasing at 1064 nm, the birefringent material can be sufficiently thick or long to act simultaneously as a half-wave plate and a full-wave plate for two adjacent resonant modes under the same gain curve when separated by less than about 1 nm. In such a case a two frequency output is obtained (See FIG. 2). One mode is characterized by a polarization which is orthogonal to the adjacent mode.

Figure 3:
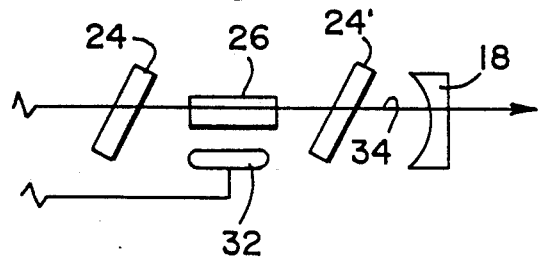
FIG. 3 is a partial schematic diagram of a variation of the embodiment shown in FIG. 1.

If dual line operation is desired and if parallel polarizations are required, then a second Brewster plate 24' is needed (See FIG. 3). The second Brewster plate 24' would be located in the laser cavity between the output coupler 18 and the birefringent material 26. This Brewster plate 24' is orientated with its polarization direction parallel or perpendicular to the other Brewster plate 24. If dual line operation is desired and if orthogonal polarizations are required, then the second Brewster plate 24' is not needed.

If the thickness or length of the birefringent material 26 is thin enough to support only a single frequency output, the polarization of the output can be either parallel or orthogonal to the axis of the first Brewster plate 24. A second Brewster plate, located adjacent to the output copule, may be used to establish the output polarization without regard to the temperature of the birefringent material. The second Brewster plate, under these circumstances, may increase the output polarization ratio.

When the laser is operated to have a dual line output, temperature control of the birefringent material 26 is more critical. During single line operation, there are multiple mode hops as the temperature of birefringent material changes. During dual line operation, there are limited (i.e., none at all) temperature scanning mode hops. The two lines are basically set in frequency so that they are essentially balanced on either side of the peak of the gain curve. The spacing between them is fixed by the temperature and length of the birefringent material 26.

From the foregoing description, it will be observed that numerous variations, alternative and modifications will be apparent to those skilled in the art. Accordingly, this description is to be construed as illustrative only and is for the purpose of teaching those skilled in the art the manner of carrying out the invention. Various changes may be made, materials substituted (e.g., iso-birefringent materials) and special features of the invention may be utilized. Also, by using means (e.g., at location "D" in FIG. 1) to control the rearward going green light (e.g., a mirror which is located between the polarizing means 24 and a frequency-doubling birefringent material 26 which is coated on one face for AR at 1064 nm and which is coated on the opposite face for AR at 1064 nm and HR at about 532 nm), the given polarization can be made to be directionally dependent and the power of the laser quadrupled over that of a single pass device. In addition, an electro-optic effect can be used with a Lyot filter to fine tune the laser to run with the least losses and at the center of the lasant material gain curve. Moreover, instead of using a separate lasant material 14 and a frequency doubler 26, a self-doubling lasant material (e.g., Tm:LiNbO$_3$ or Nd:YAB) in combination with Lyot filtering means is suggested. Finally, the present invention can be used in a folded or L-shaped cavity; the same general principles apply. Thus, it will be appreciated that various modifications, alternatives, variations, etc., may be made without departing from the spirit and scope of the invention as defined in the appended claims. It is, of course, intended to cover by the appended claims all such modification involved within the scope of the claims.

We claim:

1. A laser, comprising:
   a) a lasant material which lases at a predetermined wavelength in response to optical pumping radiation and which has a front end and a back end;
   b) an input mirror for substantially reflecting lasant light towards said front end of said lasant material;
   c) an output coupler for substantially reflecting laser light towards said input mirror and for passing therethrough at least some laser light at said predetermined wavelength;
   d) polarizing means, located to receive said light at said predetermined wavelength from said lasant material, for polarizing said lasant light from said lasant material; and
   e) birefringent means, located to receive said polarized laser light and having a length which has the effect of giving a phase retardation which is an integral multiple of the half wavelength of said light at said predetermined wavelength for producing a generally monochromatic output.

2. The laser of claim 1, further including a light emitting semi-conductor which is used to optically pump said lasant material and which selected from the group consisting of diode-lasers, superluminescent diodes, diode-laser arrays and light-emitting diodes.

3. The laser of claim 1, wherein said birefringent means is made from TeO$_2$.

4. The laser of claim 1, wherein said birefringent means is temperature tuned to function as an integral multiple of a half-wave plate at the wavelength of said predetermined wavelength.

5. The laser of claim 1, wherein said polarizing means is selected from the group consisting of a polarizing reflector and an optical surface which lies in a plane which is at the Brewster angle relative to the light from said lasant material.

6. The laser of claim 1, further including means for substantially eliminating spatial hole burning comprising two quarter-wave plates, one of said waveplates being located adjacent to each of said ends of said lasant material, said waveplates having optic axes which are generally perpendicular to the axis of the cavity formed by said input mirror and said output coupler.

7. A laser, comprising:

a) lasant rod means for lasing at a predetermined wavelength in response to optical pumping radiation and which has two opposite ends which define an optical reference axis;

b) an input mirror for transmitting at least some of said optical pumping radiation to one end of said lasant rod means and for substantially reflecting light at said predetermined wavelength towards said one end of said lasant rod means;

c) Brewster plate means, located at the opposite end of said lasant rod means, for polarizing said light at said predetermined wavelength;

d) birefringent means, located along said optical reference axis and having a length proportional to one half of said predetermined wavelength, for birefringently receiving said polarized light; and e) an output mirror, located along said optical reference axis, for substantially reflecting laser light at said predetermined wavelength towards said Brewster plate means and for transmitting therethrough at least some of said light at said predetermined wavelength.

8. The laser of claim 7, further including a waveplate, located between said input mirror and said Brewster plate means, having a thickness of an integral multiple of a half-wave plate.

9. The laser of claim 7, further including two quarter-wave plates which are located adjacent to said opposite ends of said lasant rod means and which have optic axes which are orientated relative each other to function, with said Brewster plate means, as a birefringent filter.

10. A single frequency laser, comprising:

a lasant material which is adapted to lase at a predetermined wavelength in an optical cavity in response to a source of optical pumping radiation;

Lyot filter means, located in said cavity at the output end of said cavity, for monochromatically polarizing lasant light radiated from said lasant material; and half-wave plate means, located in said cavity between the input end of said cavity and said Lyot filter means, for providing a phase retardation proportioned to half of said predetermined wavelength.

11. The laser of claim 10, wherein said half-waveplate means comprises two essentially identical quarter-wave plates which are located at opposite ends of said lasant material and which have a fast axes which are aligned.

12. The laser of claim 11, wherein said Lyot filter means comprises:

polarizing means for polarizing light along a direction of polarization; and a birefringent material whose axes are positioned at acute angles to said direction of polarization established by said polarizing means, said fast axes of said quarter-wave plates lying on each side of said direction of polarization.

13. The laser of claim 12, wherein said birefringent material is temperature tuneable to function as an integral multiple of half the wavelength of said light at said predetermined wavelength.

14. The laser of claim 13, wherein said source is a laser-diode; and further including: means for controlling the temperature of said birefringent material; and means for controlling the temperature of said laser-diode.

15. A method of producing light at essentially a single frequency, comprising the steps of:

a) locating a lasant rod in an optical cavity which is formed by two mirrors and which defines a reference axis;

b) pumping one end of said rod with diode-laser means to produce light at an infrared or near infrared wavelength;

c) polarizing said light from said rod along a direction of polarization;

d) applying said polarized light to a birefringent crystal which is located in said cavity; and e) maintaining said crystal at a temperature such that it produces a phase shift which is an integral multiple of one half the wavelength of said polarized light from said rod.

16. The method of claim 15, further including the step of eliminating spatial hole burning in said rod by locating a quarter-wave plate adjacent to each end of said rod and by positioning both plates at right angles to said reference axis.

17. The method of claim 15, wherein step (c) is performed by using a transparent light reflecting plate which lies in a plane which is at the Brewster angle relative to said reference axis.

18. The method of claim 15, wherein step (a) is performed by using a lasant rod made from Nd:YAG; and wherein step (d) is performed by using a crystal made from $TeO_2$.

19. A method of controlling the output frequency of a laser having a lasant gain medium which is characterized by at least two gain curve distributions over a range of lasant frequencies and having a laser cavity which is characterized by at least one resonant frequency within one of said at least two gain curve distributions, comprising the steps of:

a) inserting in said laser cavity a first birefringent filter which has a transmission band which favors at least part of the frequency range of said one gain curve distribution in preference to at least part of the frequency range of the other of said gain curves; and b) inserting in said cavity a second birefringent filter which has a transmission band which favors said at least one resonant frequency within said one gain curve distribution such that at least one single frequency output is obtained.

20. The method of claim 19, wherein step (a) is performed by using a first birefringent filter comprising one or more waveplates which have the performance of an integral multiple of half-wave plates.

21. The method of claim 20, wherein said first birefringent filter further comprises a Brewster plate.

22. The method of claim 19, wherein step (b) is performed by using a second birefringent filter comprising a birefringent crystal characterized by a length dimension through which laser light passes in said cavity, said length dimension being selected to be an integral multiple of half of the wavelength corresponding to said one resonant frequency.

23. The method of claim 22, further including the step of:

c) controlling the temperature of said crystal to have an effective length which is a multiple of a half-wave plate for said one frequency.

24. The method of claim 19, wherein at least two resonant frequencies are located within said one gain curve; and wherein step (b) is performed by using a second birefringent filter having a transmission band which favors said two resonant frequencies, such that a dual frequency output is obtained.

25. The method of claim 24, further including the step of:
    c) using a Brewster plate, located between said second birefringent filter and the output end of said cavity, to control the polarization of said dual frequency output.

26. The method of claim 24, wherein said at least two resonant frequencies include one resonant frequency which has a polarization which is orthogonal to the polarization of a second resonant frequency; and further including the step of (c) locating a polarizing element in said cavity to select one of said polarizations.

27. The method of claim 24, wherein said second birefringent filter comprises a birefringent crystal; and wherein step (b) includes the step of selecting the crystal to have a birefringence and dispersion such that two predetermined adjacent resonant frequencies are selected.

28. The method of claim 19, wherein said gain medium is Nd:YAG which has a gain curve between 1060 nm and 1062 nm and another gain curve between 1063 nm and 1065 nm; and wherein step (b) is performed by using a crystal of $TeO_2$.

29. The method of claim 28, wherein step (a) is performed by using a quartz quarter-wave plate located between said gain medium and said crystal of $TeO_2$.

30. The method of claim 29, wherein steps (a) and (b) are performed by using a Brewster plate located between said quartz quarter-wave plate and said crystal of $TeO_2$.

31. A laser, comprising,
    a) a cavity which is resonant at least one predetermined optical frequency, which defines a reference axis and which has an output coupler;
    b) a solid-state gain material which is located on said axis in said cavity, which is characterized by at least one gain curve which includes said predetermined optical frequency, and which has two opposite ends;
    c) spatial hole-burning control means comprising a first quarter-wave plate located at one end of said gain material and a second quarter-wave plate located at the opposite side of said gain material and between said gain material and said output coupler;
    d) Brewster plate means located between said second quarter wave-plate and said output coupler and having an axis which is aligned relative to said quarter-wave plates to function as a birefringent filter whose transmission band favors said one gain curve; and
    e) a birefringent optical element which is located between said output coupler and said Brewster plate means, and which is aligned relative to said Brewster plate means to form a birefringent filter whose transmission band favors said one optical frequency.

* * * * *